(12) United States Patent
Nikolin et al.

(10) Patent No.: US 8,506,667 B2
(45) Date of Patent: Aug. 13, 2013

(54) FILTERS AND METHODS FOR IMPARTING STRUCTURAL SUPPORT TO PLEATED FILTER MEDIA

(75) Inventors: Przemyslaw Krzysztof Nikolin, Hampshire (GB); Jamison William Janawitz, Overland Park, KS (US); Jason Mei, Lee's Summit, MO (US)

(73) Assignee: General Electric Company, Schenectady, NY (US)

( * ) Notice: Subject to any disclaimer, the term of this patent is extended or adjusted under 35 U.S.C. 154(b) by 298 days.

(21) Appl. No.: 13/006,525

(22) Filed: Jan. 14, 2011

(65) Prior Publication Data
US 2012/0180444 A1    Jul. 19, 2012

(51) Int. Cl.
*B01D 39/00* (2006.01)

(52) U.S. Cl.
USPC ............... 55/498; 55/521; 210/232; 210/411; 210/493; 210/493.1; 210/485; 264/249

(58) Field of Classification Search
USPC .............. 55/498, 521, DIG. 5; 210/232, 411, 210/493.1–493.5, 485, 489; 264/249
See application file for complete search history.

(56) References Cited

U.S. PATENT DOCUMENTS

| | | | |
|---|---|---|---|
| 4,402,830 A | 9/1983 | Pall | |
| 5,252,207 A | 10/1993 | Miller et al. | |
| 5,552,048 A * | 9/1996 | Miller et al. | ................. 210/489 |
| 6,508,934 B2 | 1/2003 | Van Pelt et al. | |
| 6,887,343 B2 | 5/2005 | Schukar et al. | |
| 6,911,144 B2 * | 6/2005 | Van Pelt et al. | ............... 210/232 |
| 2002/0074279 A1 | 6/2002 | Van Pelt et al. | |
| 2003/0070976 A1 * | 4/2003 | Van Pelt et al. | ............... 210/232 |
| 2008/0272048 A1 * | 11/2008 | Mei et al. | .................. 210/493.2 |

FOREIGN PATENT DOCUMENTS

| | | |
|---|---|---|
| EP | 0 083 789 A2 | 7/1983 |
| EP | 0 470 485 A2 | 2/1992 |

* cited by examiner

*Primary Examiner* — Robert Clemente
*Assistant Examiner* — Karla Hawkins
(74) *Attorney, Agent, or Firm* — Sutherland Asbill & Brennan LLP

(57) ABSTRACT

Certain embodiments of the invention may include filters and methods for imparting structural support to a pleated filter material. According to an example embodiment, the method includes forming a filter structure from one or more sections of pleated filter media, wherein the filter structure comprises one or more filter pleats. The method also includes extruding a banding material to form one or more radial support regions in at least circumferential contact with at least one of an inner or an outer surface of the filter structure, and maintaining spacing between the one or more filter pleats of the filter structure with the one or more radial support regions.

18 Claims, 6 Drawing Sheets

FILTERS AND METHODS FOR IMPARTING STRUCTURAL SUPPORT TO PLEATED FILTER MEDIA

FIELD OF THE INVENTION

This invention generally relates to filters, and in particular, to imparting structural support to pleated filter media.

BACKGROUND OF THE INVENTION

Pleated filter materials have proven to be useful in many gas and/or fluid filtering applications where space is limited and/or where a large effective filtering surface area is desired within a confined space. Pleated filter materials may also be utilized to minimize the pressure drop across the filter media during the filtering process. Some filter cartridges include pleated filter media with metal reinforcing housings, mesh, or banding structures to contain and support the filter media. Often, the metal reinforcement material can be expensive, bulky, and challenging to manufacture. Some of these reinforcing structures may be attached to the filter media with an adhesive that may degrade in corrosive or high temperature environments.

A need remains for improved filter media, reinforcement material, and methods for imparting structural support to pleated filter media.

BRIEF SUMMARY OF THE INVENTION

Some or all of the above needs may be addressed by certain embodiments of the invention. Certain embodiments of the invention may include filters and methods for imparting structural support to pleated filter media.

According to an example embodiment of the invention, a method is provided for imparting structural support to a pleated filter material, the method can include forming a filter structure from one or more sections of pleated filter media, where the filter structure may include one or more filter pleats. The method also includes extruding a banding material to form one or more radial support regions in at least circumferential contact with at least one of an inner or an outer surface of the filter structure, and maintaining spacing between the one or more filter pleats of the filter structure with the one or more radial support regions.

According to another example embodiment, a filter cartridge is provided for filtering particles from a gas or liquid. The filter cartridge includes a filter media having a plurality of pleats and arranged in a substantially cylindrical or conical shape about an axis. The filter cartridge also includes at least one end cap where least a portion of the filter media is secured to the at least one end cap. The filter cartridge also includes one or more radial support regions in circumferential contact with at least one of an inner or an outer surface of the filter media, where spacing of at least some of the plurality of pleats is maintained at least in part by the one or more radial support regions.

According to another example embodiment, another filter cartridge is provided for filtering particles from a gas or liquid. The filter cartridge includes a filter media having a plurality of pleats and arranged in a substantially cylindrical or conical shape about an axis. The filter cartridge also includes one or more radial support regions in circumferential contact with at least one of an inner or an outer surface of the filter media, where spacing of at least some of the plurality of pleats is maintained at least in part by the one or more radial support regions.

Other embodiments and aspects of the invention are described in detail herein and are considered a part of the claimed invention. Other embodiments and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Figure 1:
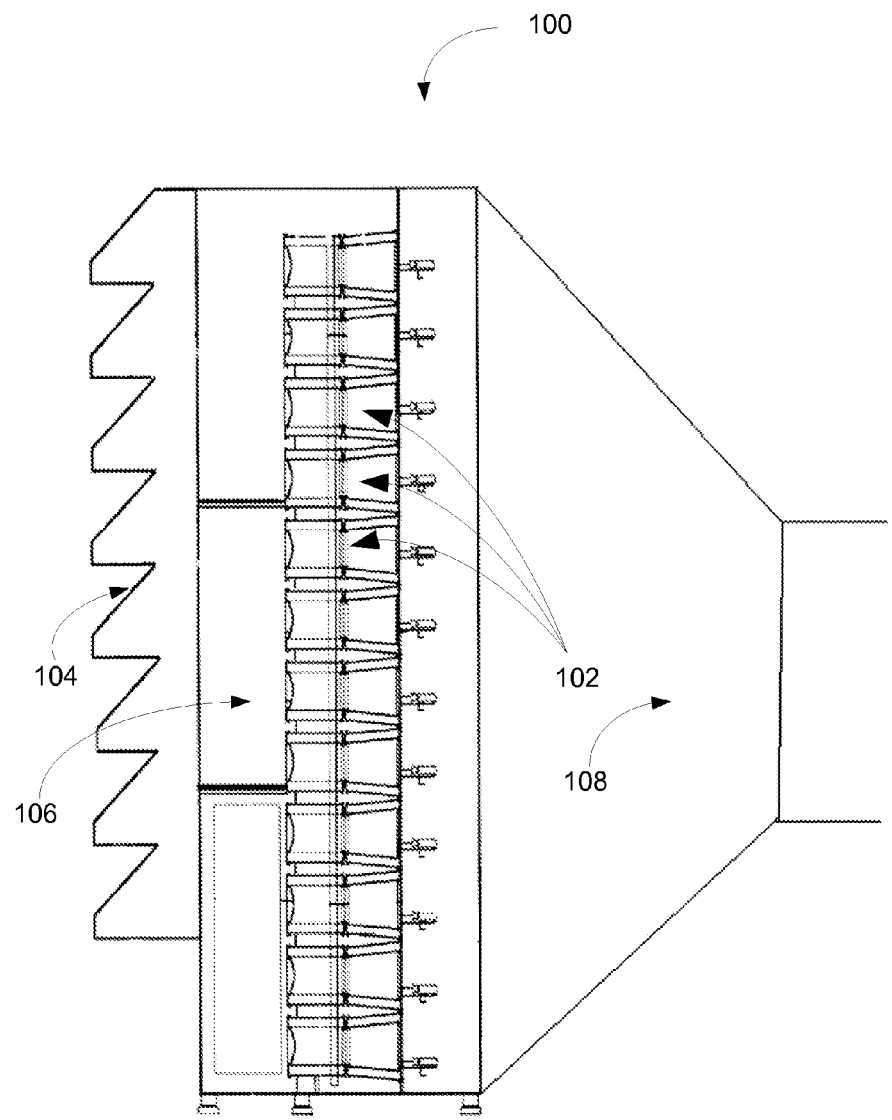
FIG. 1 is a block diagram of an illustrative filter house according to an example embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments of the invention may enable imparting structural support to a pleated filter material. In an example embodiment, a thermoplastic elastomer material (herein referred to as "iPLAS") may be extruded and applied externally on a rolled section of pleated media to impart structural support. According to example embodiments, iPLAS retaining material may be applied on an inner diameter of the rolled pleated material to provide structural support for a filter made with pleated filter material. In accordance with certain example embodiments, the iPLAS retaining material may be extruded and applied in one or more continuous loops on the outer and/or inner diameter of the pleated media element. In accordance with example embodiments, the iPLAS retaining material may be extruded and applied to maintain shape, pleat spacing and/or relative position of the pleats.

According to example embodiments of the invention, the iPLAS material may be extruded and applied to the pleated filter material in a semi-liquid form, with viscosity and flow controlled at least in part by temperature. According to certain example embodiments, the iPLAS material, in its heated or semi-liquid state, may partially absorb into a depth of the pleated filter material upon application, and may become attached, entangled, or fused within at least a portion of the filter's fiber structure. Then, according to an example embodiment, when the iPLAS material cools and becomes a substantially solid support structure, the portion of the thermoplastic in contact with the filter material may be attached to the tips of the pleated filter material without additional adhesive.

According to example embodiments of the invention, filters made using the methods described herein may be suitable for imparting strength to filters for structural integrity and to prevent ripping or damage to the filter during filtering and/or during reverse pulse cleaning processes.

As indicated in the background section above, a typical pulse or static filter cartridge contains filter media sandwiched between two layers of expandable metal mesh. The metal mesh layers create a rigid cage around the filter element. In contrast, and according to example embodiments of the invention, one or more of the metal mesh layers may be replaced by the iPLAS material. In one example embodiment, a filter cartridge may include iPLAS material instead of expandable metal reinforcement on the outer diameter. In another example embodiment, a filter cartridge may include iPLAS material instead of expandable metal reinforcement on the inner diameter. In another example embodiment, a filter cartridge may include iPLAS material instead of expandable metal reinforcement on both the inner and outer diameters, thereby sandwiching the pleated filter material between bands of iPLAS. In an example embodiment, the iPLAS band may be configured to provide structural support, similar to the metal mesh, but the iPLAS may provide additional exposure of the filtration media to the surrounding plenum, which may be beneficial during filtering and/or during the reverse pulse cleaning process.

Various thermoplastic elastomer extrusion configurations in conjunction with pleated filter media may be utilized for preparing filter cartridges, according to example embodiments of the invention, and will now be described with reference to the accompanying figures.

FIG. 1 illustrates an example filter house 100, according to an example embodiment, for which embodiments of the invention may be utilized. For example, the filter house 100 may include an array of filter cartridges 102. In an example embodiment, un-filtered air 104 may enter the filter house 100 via an unfiltered air plenum 106 in communication with at least one side of the filter cartridges 102 (in this case, for example, an exterior side). In an example embodiment, impurities may be removed from the input air 104 air passing through the filter cartridges 102, and the clean air on the interior part of the filter cartridges 102 may travel through a clean air plenum 108. In an example embodiment, the unfiltered air plenum 106 and the clean air plenum 106 are separated by the filter media so that unfiltered air 104 passes through the filter cartridges 102 to enter the clean air plenum 108.

FIG. 1 depicts a filter house having twelve filter cartridges 102 in each vertical column, in accordance with an embodiment of the invention. However, the filter house may include any number of filter cartridges 102. The filter cartridges 102 are generally elongate and may be arranged parallel (e.g., along axes of elongation) to each other in a substantially vertical manner. It can be appreciated that the filter cartridges may have lengths, widths, and profile shapes that differ dependent upon desired configurations.

According to example embodiments, the filter cartridges 102 may be capable of filtering air to remove a variety of impurities. For instance, the filter cartridges 102 may be used, but are not limited, to filter hot gas(es) with temperature of up to approximately 500° F. (260° C.) and with temperature surges up to approximately 700° F. (371° C.). In addition, example embodiment of the filter cartridges 102 may be used in applications in environments that may have gas streams or dust that is acidic or alkaline. These applications may include, but are not limited to, carbon black processing, titanium dioxide processing, etc.

Figure 2:
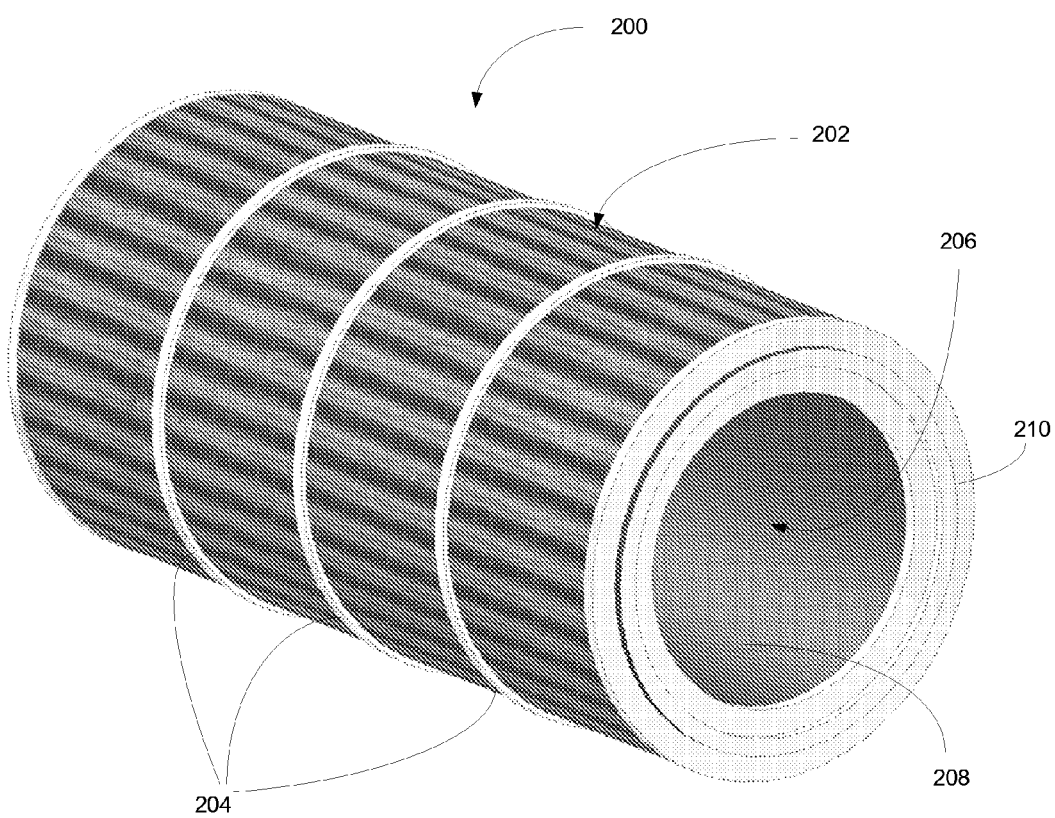
FIG. 2 is an illustration of a filter cartridge, according to an example embodiment of the invention.

FIG. 2 depicts an example embodiment of a filter cartridge 200 having pleated filter material 202 supported radially by bands of outer supports 204, in accordance with another embodiment of the invention. The outer supports 204 may be made by extruding thermoplastic elastomer (iPLAS) in one or more continuous rings. According to an example embodiment, the outer supports 204 may be extruded directly onto the pleated filter material 202 and the column of pleated filter material 202 may be rotated about an axis of elongation while extruding the iPLAS material in order to form one or more continuous outer support 204 bands. In another example embodiment, the outer supports 204 may be extruded directly onto the pleated filter material 202 and the column of pleated filter material 202 may be rotated about an axis of elongation while translating the column of pleated material 202 along the axis of elongation while extruding the iPLAS material in order to form a continuous helical spiral of outer support 204 along the length of the filter cartridge 202.

FIG. 2 also shows an example embodiment of the invention where the filter cartridge 200 includes an inner mesh support 208, but outer extruded iPLAS outer supports 204. Example embodiments of the invention may include a filter aperture 206 for which clean air may exit or dirty air may enter, depending on the air handling configuration. Example embodiments may include a housing seal 210. In an example embodiment, the housing seal 210 may provide an air-tight seal with a filter house tube sheet or other mounting interface. In an example embodiment, the housing seal 210 may include metal. In an example embodiment, the housing seal 210 may include extruded iPLAS material.

Figure 3:
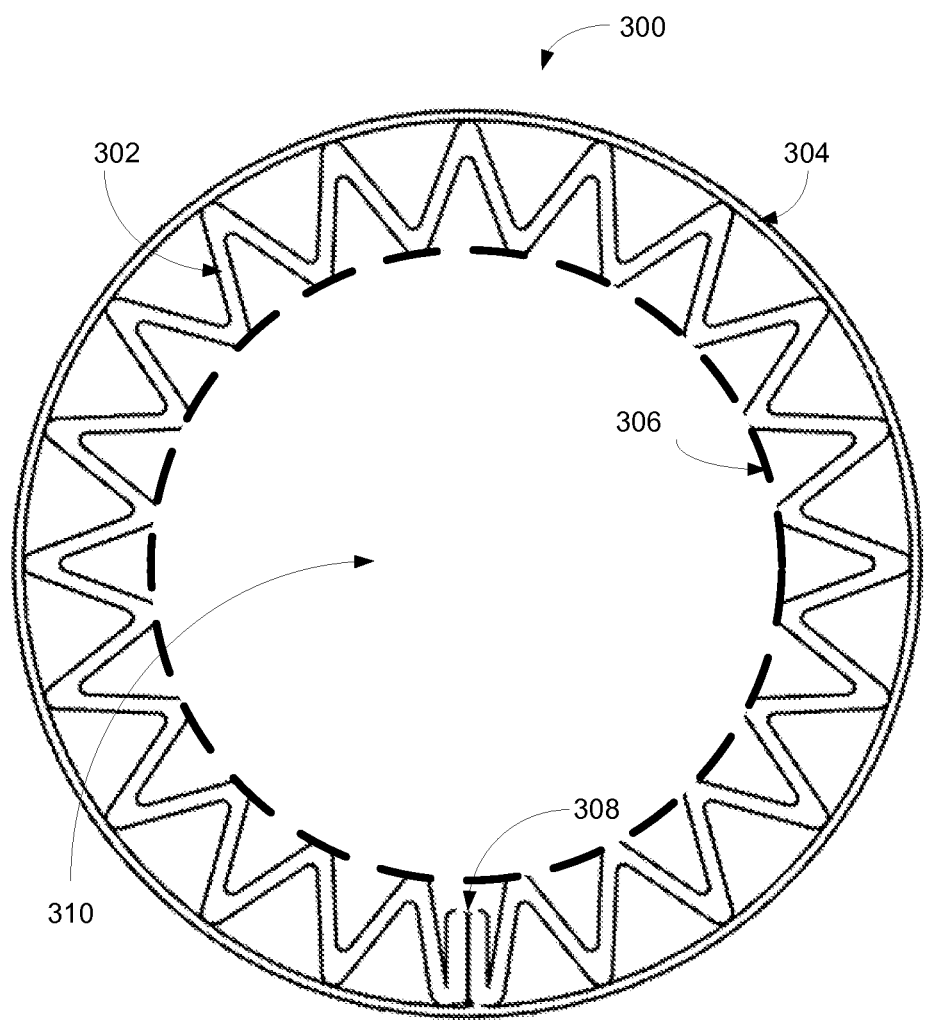
FIG. 3 is an illustration of a filter end view, according to an example embodiment of the invention.

FIG. 3 depicts a cross sectional view of a filter cartridge 300, according to an example embodiment of the invention. As indicated in this example embodiment, the filter cartridge 300 may include pleated filter material 302, outer support material 304, optional inner support material 306, filter material ends 308, and a filter aperture 310. According to an example embodiment, the outer support 304 may be extruded thermoplastic elastomer (iPLAS) materials. According to another example embodiment, the outer support 304 may be expanded metal mesh. The inner support material 306 may either be omitted, or embodied in one of two alternative forms, according to example embodiments of the invention: (i) extruded thermoplastic elastomer (iPLAS) material, or (ii) expanded metal mesh.

Figure 4:
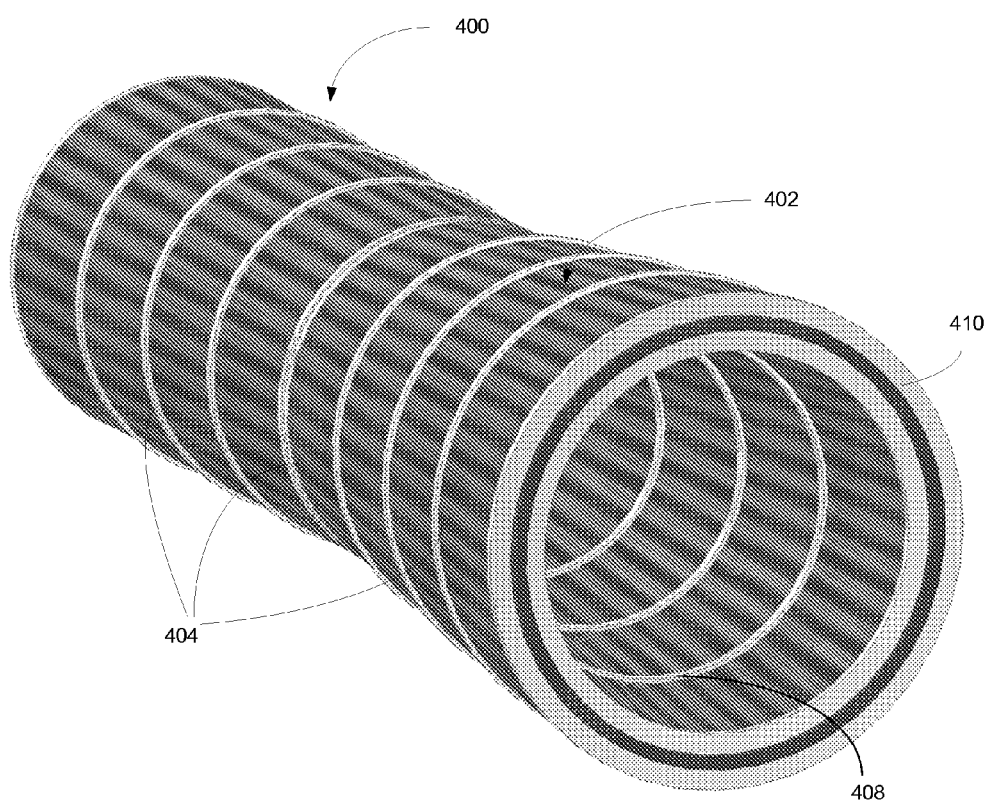
FIG. 4 is an illustration of another filter cartridge, according to an example embodiment of the invention.

FIG. 4 depicts an example two-piece filter cartridge 400, according to an example embodiment of the invention, having outer iPLAS supports 404 and inner iPLAS supports 408 for retaining and supporting the pleated filter material 402. According to an example embodiment, the filter cartridge 400 may include a housing seal 410. In an example embodiment, the housing seal 410 may provide an air-tight seal interface with a filter house tube sheet or other mounting interface. In an example embodiment, the housing seal 410 may include metal. In an example embodiment, the housing seal 410 may include extruded iPLAS material. In other example embodiments, the housing seal 410 may include combinations of metal and other suitable materials such as plastic, rubber, etc.

Figure 5:
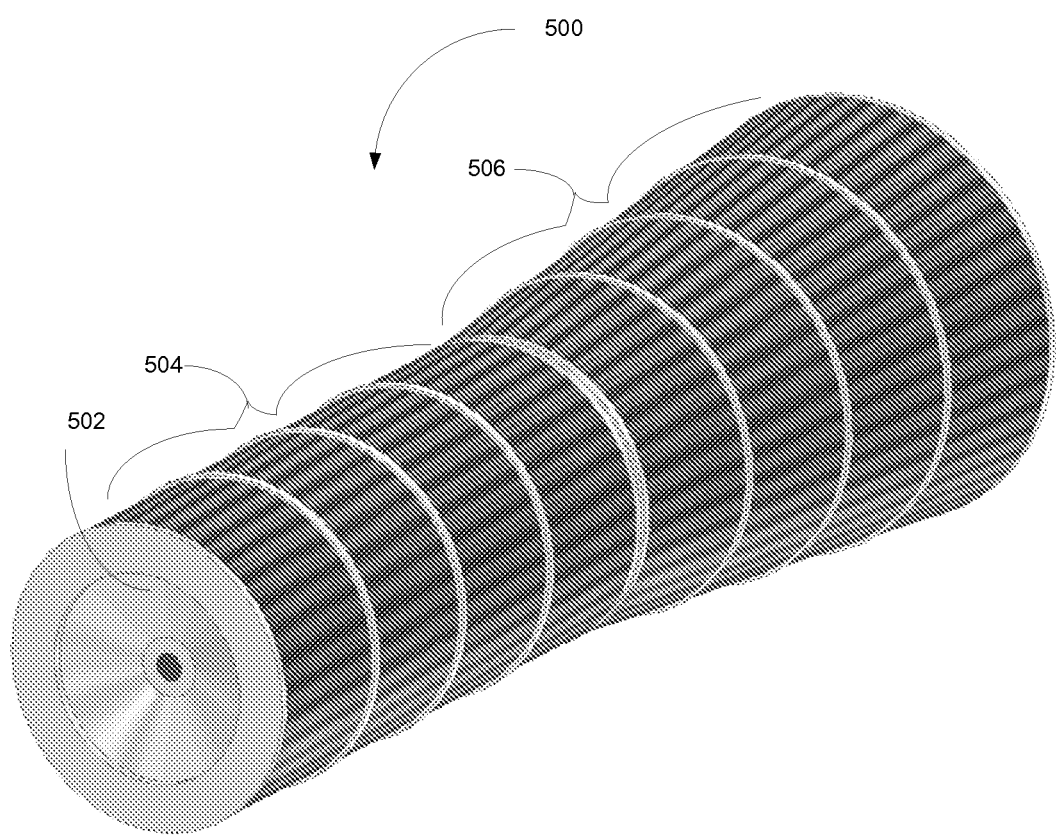
FIG. 5 is an illustration of another filter cartridge, according to an example embodiment of the invention.

FIG. 5 illustrates another example view of a two-piece filter cartridge 500 according to an embodiment of the invention. In this example embodiment, the filter cartridge may include an end support and cap 502, that is positioned at the end of the filter cartridge 500, and opposite of the filter aperture (as in 206, FIG. 2). In an example embodiment, the end support and cap 502 may be made of metal or rigid plastic, and may provide a means for attaching and securing the filter cartridge to the filter house tube sheet. According to an example embodiment, and as illustrated in both FIG. 4 and FIG. 5, the filter cartridge 500 may include two sections: a cylindrical section 504, and a conical section 506, for example. In an example embodiment, the two sections 504 506 may be joined or pressed together near the midsection of the combined cartridge 500, and may provide a means to increase the size and effective filtering surface area of the combined filter cartridge 500, while allowing the weight of each filter section to be light enough for service personnel to manually install or replace the filters.

Figure 6:
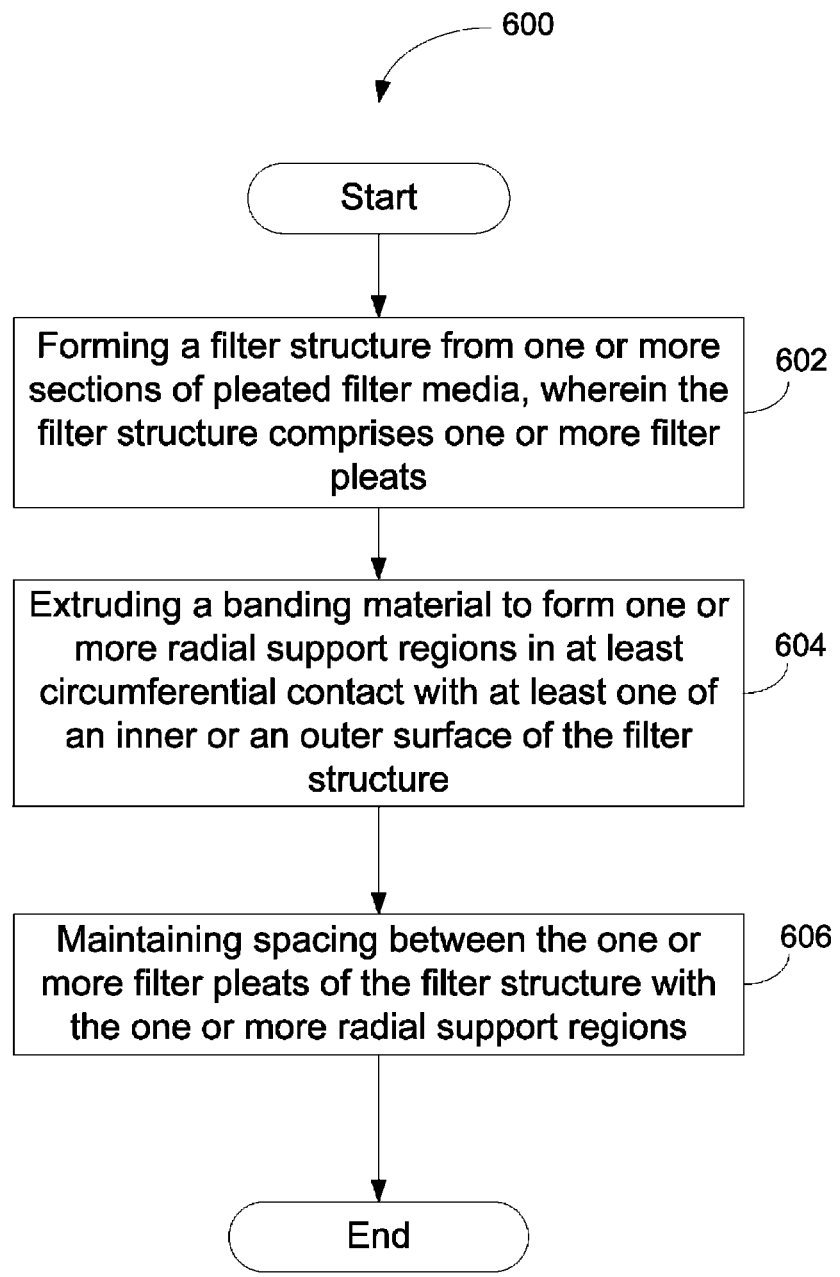
FIG. 6 is a flow diagram of an example method according to an example embodiment of the invention.

An example method 600 for imparting structural support to a pleated filter material in accordance with an embodiment of the invention will now be described with reference to the flowchart of FIG. 6. The method 600 starts in block 602, and according to an example embodiment of the invention, the method 600 includes forming a filter structure from one or more sections of pleated filter media, wherein the filter structure comprises one or more filter pleats. In block 604, the method 600 includes extruding a banding material to form one or more radial support regions in at least circumferential contact with at least one of an inner or an outer surface of the filter structure. In block 606, the method 600 includes maintaining spacing between the one or more filter pleats of the filter structure with the one or more radial support regions. The method 600 ends after block 606.

According to example embodiments, a filter structure may be formed by connecting at least two ends of a continuous section of pleated filter material. Example embodiments of the invention may include extruding radial support regions or banding material in one or more continuous bands in contact with the pleated filter material. In an example embodiment, the radial support regions or banding material may provide radial structural support of the pleated filter material. Example embodiments may include extruding a banding material that includes a thermoplastic elastomeric (TPE) material and such example materials may form a substantially solid structure that fuses with one or more portions of the pleated filter material. According to example embodiments, the banding material may be extruded in continuous bands up to about 1 inch (2.5 cm) in width. Certain example embodiments may further include applying a metal mesh in contact with at least one of an inner or an outer surface of the filter structure.

In accordance with an example embodiment of the invention, the banding or support structures can be made from any suitable material. In an example embodiment, extruded polyester material may be used. According to example embodiments, polyester material may include thermoplastic, polyester, elastomers, etc. A non-limiting example of thermoplastic, polyester, elastomers includes HYTREL® available from E. I. Du Pont de Nemours & Company, having a place of business at 1007 Market Street, Wilmington, Del. 19898. HYTREL® utilizes polyether-ester block copolymers consisting of hard (crystalline) segment of polybutylene terephthalate and soft (amorphous) segment based on long-chain polyether glycols. In addition, HYTREL® combines the features found in elastomers and flexible plastics including toughness, resilience, high resistance to creep, impact and flex fatigue, flexibility at low temperatures and good property retention at elevated temperatures. Moreover, HYTREL® resists deterioration from many industrial chemicals, oils and solvents. Furthermore, HYTREL® is supplied as cylindrical to oval-shaped pellets that may be extruded under heat and pressure.

Two specific grades of HYTREL® that are suitable for use in the banding or support structures, according to example embodiments, include HYTREL® 5556 or HYTREL® 8238 thermoplastic polyester elastomers. HYTREL® 8238, without additional additives, is a high modulus molding and extrusion grade, thermoplastic, polyester, elastomer that also contains color-stable antioxidants. The hardness measured by a durometer for HYTREL® 8238 is 82 Shore D, while the flexural modulus at −40° C., 23° C., and 100° C. is 3,030 MPa, 1,210 MPa, and 255 MPa, respectively. Tensile strength at breaking, elongation at breaking, tensile strength at 5% strain, and tensile strength at 10% strain for HYTREL® 8238 is 48.3 MPa, 350%, 27.6 MPa, and 30.3 MPa, respectively. Toughness characteristics for the HYTREL® 8238 includes izod impact at −40° C. and 23° C., resistance to flex cut growth and initial tear resistance with values of 30 J/m, 40 J/m, NA (cycles to 5× cut growth) and 253 kN/m respectively. Thermal characteristics for the HYTREL® 8238 includes a melt flow rate, a melting point, a vicat softening point, and a deflection temperature under flexural load at values of 0.5 MPa and 1.8 MPa with values of 12.5 g/10 minutes, 240° C., 223° C., 212° C., 140° C., and 55° C., respectively. Other characteristics for the HYTREL® 8238 include specific gravity, water absorption at a 1 kilogram load, taber abrasion with a CS-17 wheel and taber abrasion with a H-18 wheel with values of 1.28, 0.3%, 9 and 20, respectively.

HYTREL® 5556, without additional additives, is a medium modulus molding and extrusion grade, thermoplastic, polyester, elastomer that contains color-stable antioxidants. The hardness measured by a durometer for HYTREL® 5556 is 55 Shore D, while the flexural modulus at −40° C., 23° C. and 100° C. is 760 MPa, 207 MPa and 110 MPa, respectively. Tensile strength at breaking, elongation at breaking, tensile strength at 5% strain, and tensile strength at 10% strain for HYTREL® 5556 is 40 MPa, 500%, 6.9 MPa, and 10.3 MPa, respectively. Toughness characteristics for the HYTREL® 5556 include an izod impact at −40° C. and 23° C., resistance to flex cut growth and initial tear resistance with values of 170 J/m, No Break, $5 \times 10^5$ (cycles to 5× cut growth) and 158 kN/m respectively. Thermal characteristics for the HYTREL® 5556 includes a melt flow rate, a melting point, a vicat softening point, and a deflection temperature under flexural load at values of 0.5 MPa and 1.8 MPa, with values of 7.5 g/10 minutes, 220° C., 203° C., 180° C., 90° C., and 49° C., respectively. Other characteristics for the HYTREL® 5556 include specific gravity, water absorption at a 1-kilogram load, taber abrasion with a CS-17 wheel and taber abrasion with a H-18 wheel with values of 1.20, 0.5%, 6 and 64, respectively.

In accordance with example embodiments of the invention, thermoplastic, polyester, elastomers have been developed for use with the banding or support structures. Example material embodiments may be referred to as iPLAS technology. In an example embodiment, the hardness measured by a durometer for the thermoplastic, polyester, elastomer may range from about 40 Shore D to about 82 Shore D. In another example embodiment, the hardness for the thermoplastic, polyester, elastomer may range from about 50 Shore D to about 65 Shore D.

In an example embodiment, the flexural modulus at −40° C. for the thermoplastic, polyester, elastomer may range from about 155 MPa to about 3,030 MPa. According to another example embodiment, the flexural modulus at −40° C. for the thermoplastic, polyester, elastomer may range from about 500 MPa to about 2,410 MPa. According to another example embodiment, the flexural modulus at −40° C. for the thermoplastic, polyester, elastomer may range from about 760 MPa to about 1,800 MPa. According to an example embodiment, the flexural modulus at 23° C. for the thermoplastic, polyester, elastomer may be within a range from about 62 MPa to about 1,210 MPa. According to another example embodiment, the flexural modulus at 23° C. for the thermoplastic, polyester, elastomer may be within a range from about 150

MPa to about 570 MPa, or in a range from about 207 MPa to about 330 MPa. In accordance with an example embodiment, the flexural modulus at 100° C. for the thermoplastic, polyester, elastomer may be in the range from about 27 MPa to about 255 MPa, in a range from about 75 MPa to about 207 MPa, or in a range from about 110 MPa to about 150 MPa.

According to example embodiments, the tensile strength at breaking for the thermoplastic, polyester, elastomer may be in a range from about 28 MPa to about 48.3 MPa, in a range from about 35 MPa to about 45.8 MPa, or in a range from about 40 MPa to about 41 MPa.

According to example embodiments, the elongation at breaking for the thermoplastic, polyester, elastomer may be in a range from about 350% to about 550%, in a range from about 360% to about 525%, or in a range from about 420% to about 500%. According to example embodiments, the tensile strength at 5% strain for the thermoplastic, polyester, elastomer may be in a range from about 2.4 MPa to about 27.6 MPa, in a range from about 5.0 MPa to about 14 MPa, or in a range from about 6.9 MPa to about 12 MPa.

According to example embodiments, the tensile strength at 10% strain for the thermoplastic, polyester, elastomer may be in a range from about 3.6 MPa to about 30.3 MPa, in a range from about 7.5 MPa to about 20 MPa, or in a range from about 10.3 MPa to about 16 MPa.

The notched izod impact at −40° C. for the thermoplastic, polyester, elastomer may be in a range from about 25 J/m to "No Break", in a range from about 40 J/m to "No Break", or in a range from about 170 J/m to "No Break". In example embodiments, the notched izod impact at 23° C. for the thermoplastic, polyester, elastomer is preferably in a range from about 35 J/m to "No Break", or in a range from "No Break" to "No Break".

In accordance with example embodiments, the resistance to flex cut growth for the thermoplastic, polyester, elastomer is in a range from about $3 \times 10^4$ cycles to 5x cut growth to greater than $1 \times 10^6$ cycles to 5x cut growth, in a range from about $4 \times 10^5$ cycles to 5x cut growth to greater than $1 \times 10^6$ cycles to 5x cut growth, or in a range from about $5 \times 10^5$ cycles to 5x cut growth to greater than $1 \times 10^6$ cycles to 5x cut growth.

In accordance with example embodiments, the initial tear resistance for the thermoplastic, polyester, elastomer is in a range from about 100 kN/m to about 260 kN/m, in a range from about 130 kN/m to about 200 kN/m, or in a range from about 150 kN/m to about 180 kN/m.

In certain example embodiments, the melt flow rate for the thermoplastic, polyester, elastomer is in a range from about 4.0 g/10 minutes to about 15.0 g/10 minutes, in a range from about 7.0 g/10 minutes to about 11.0 g/10 minutes, or in a range from about 7.0 g/10 minutes to about 9.0 g/10 minutes.

In example embodiments, the melting point for the thermoplastic, polyester, elastomer is in a range from about 150° C. to about 225° C., in a range from about 195° C. to about 218° C., or in a range from about 203° C. to about 211° C.

According to example embodiments, the vicat softening point for the thermoplastic, polyester, elastomer is in a range from about 108° C. to about 220° C., in a range from about 160° C. to about 205° C., or in a range from about 180° C. to about 195° C.

In accordance with example embodiments, the deflection temperature under flexural load at values of 0.5 MPa for the thermoplastic, polyester, elastomer may be in a range from about 50° C. to about 150° C., in a range from about 70° C. to about 130° C., or in a range from about 90° C. to about 115° C.

In example embodiments, the deflection temperature under flexural load at values of 1.8 MPa for the thermoplastic, polyester, elastomer may be in a range from about 40° C. to about 60° C., in a range from about 45° C. to about 52° C., or in a range from about 49° C. to about 51° C.

In accordance with example embodiments, the specific gravity for the thermoplastic, polyester, elastomer may be in a range from about 1.10 to about 1.30, in a range from about 1.15 to about 1.25, or in a range from about 1.20 to about 1.22.

The water absorption at a 1 kilogram load for the thermoplastic, polyester, elastomer may be in a range from about 0.25% to about 0.75%, in a range from about 0.3% to about 0.6%, or in a range from about 0.3% to about 0.5%. The taber abrasion with a CS-17 wheel for the thermoplastic, polyester, elastomer may be in a range from about 3 mg/1,000 revolutions to about 15 mg/1,000 revolutions, in a range from about 6 mg/1,000 revolutions to about 13 mg/1,000 revolutions. or in a range from about 7 mg/1,000 revolutions to about 10 mg/1,000 revolutions. The taber abrasion with a H-18 wheel for the thermoplastic, polyester, elastomer may be in a range from about 20 mg/1,000 revolutions to about 100 mg/1,000 revolutions, in a range from about 50 mg/1,000 revolutions to about 75 mg/1,000 revolutions, or in a range from about 60 mg/1,000 revolutions to about 70 mg/1,000 revolutions.

According to example embodiments of the invention, additives may be included in the thermoplastic, polyester, elastomer. For example, pure thermoplastic, polyester, elastomer without additional additives may be in range from about 80 volume % to about 95 volume %, in a range from about 82 volume % to about 90 volume %, or in range from about 85 volume % to about 86 volume %.

A first illustrative, but non-limiting, example of an additive can include a hydrolytic stabilizer compound for improving serviceability in hot, moist environments. An illustrative, but non-limiting example, includes HYTREL® 10MS available from E. I. Du Pont de Nemours & Company, having a place of business at 1007 Market Street, Wilmington, Del. 19898. In illustrative, but non-limiting examples, a percentage of hydrolytic stabilizer in the thermoplastic, polyester, elastomer compound may be in a range from about 2.0 volume % to about 12.0 volume %, in a range from about 5.0 volume % to about 10 volume %, or in a range from about 9.0 volume % to about 9.5 volume %.

According to example embodiments, another additive can also include a heat stabilizer for retarding thermal oxidative degradation and extend useful life at elevated temperatures. For example, an additive can include HYTREL® 30HS available from E. I. Du Pont de Nemours & Company, having a place of business at 1007 Market Street, Wilmington, Del. 19898. In an example embodiment, heat stabilizer in the thermoplastic, polyester, elastomer compound may be in a range from about 2.0 volume % to about 6.0 volume %, in a range from about 3.0 volume % to about 5.0 volume %, or in a range from about 4.0 volume % to about 4.75 volume %. These additives are illustrative examples of the numerous additives that may be utilized with the invention.

In accordance with example embodiments, HYTREL® 5556 may be utilized with the above two additives. In such embodiments, the melt flow rate at 220° C. may be in a range from 5.0 grams per 10 minutes to about 10.0 grams per 10 minutes, or in a range of 6.0 grams per 10 minutes to about 9.0 grams per 10 minutes. According to example embodiments, the number average molecular weight may be in a range from 30,000 to about 60,000, or in a range of 35,000 to about 55,000. In certain example embodiments, the weight average molecular weight may be in a range from 60,000 to about 100,000, or in a range of 65,000 to about 98,000. According to example embodiments, the intrinsic viscosity may be in a range from 0.7 dL/g to about 1.8 dL/g, or in a range of 1.1 dL/g to about 1.5 dL/g.

According to example embodiments of the inventions, a filter cartridge may be made according to example embodiments presented herein and may be utilized for filtering particles from a gas or liquid. Example embodiments include a filter media having a plurality of pleats and arranged in a substantially cylindrical or conical shape about an axis. Example embodiments may include at least one end cap wherein least a portion of the filter media is secured to the at least one end cap. Example embodiments may also include one or more radial support regions in circumferential contact with at least one of an inner or an outer surface of the filter media, wherein spacing of at least some of the plurality of pleats is maintained at least in part by the one or more radial support regions.

Accordingly, example embodiments of the invention can provide the technical effects of imparting structural support to pleated filter media. Example embodiments of the invention can also provide the further technical effects of replacing expensive metal mesh components by extruding and applying thermoplastic elastomer supports to the filter. Example embodiments of the invention can also provide the further technical effects of reducing or eliminating the need to glue the filter support structure to the filter media. Example embodiments of the invention can also provide the further technical effects of creating greater media exposure to the surrounding plenum.

As desired, embodiments of the invention may include the filter cartridges and extruded thermoplastic elastomer supports with more or less of the components illustrated in FIGS. 1 through 5.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for imparting structural support to a pleated filter material, the method comprising:
    forming a filter structure from one or more sections of pleated filter media, wherein the filter structure comprises one or more filter pleats;
    extruding a thermoplastic polyester elastomeric (TPE) material to form one or more radial support regions in at least circumferential contact with an inner surface and an outer surface of the filter structure; and
    maintaining spacing between the one or more filter pleats of the filter structure with the one or more radial support regions.

2. The method of claim 1, further comprising maintaining radial structural support of the pleated filter material with the one or more extruded radial support regions.

3. The method of claim 1, wherein the TPE material forms a substantially solid structure that fuses with one or more portions of the pleated filter material.

4. The method of claim 1, wherein extruding the TPE material comprises extruding one or more continuous bands in contact with the pleated filter material.

5. The method of claim 1, further comprising applying a metal mesh in contact with at least one of the inner surface or the outer surface of the filter structure.

6. The method of claim 1, wherein extruding the TPE material comprises extruding one or more continuous bands up to 1" in width.

7. The method of claim 1, wherein forming the filter structure comprises connecting at least two ends of a continuous section of pleated filter material.

8. A filter cartridge for filtering particles from a gas or liquid, comprising:
    a filter media comprising a plurality of pleats and arranged in a substantially cylindrical or conical shape about an axis;
    at least one end cap wherein at least a portion of the filter media is secured to the at least one end cap; and
    one or more radial support regions in circumferential contact with an inner surface and an outer surface of the filter media, wherein spacing of at least some of the plurality of pleats is maintained at least in part by the one or more radial support regions, and wherein the one or more radial support regions comprise extruded thermoplastic polyester elastomeric (TPE) material.

9. The filter cartridge of claim 8, wherein the one or more radial support regions are configured to provide radial support and containment of the filter media.

10. The filter cartridge of claim 8, wherein the one or more radial support regions comprise one or more continuous bands in contact with at least a portion of the filter media.

11. The filter cartridge of claim 8, further comprising a metal mesh in contact with at least one of the inner surface or the outer surface of the filter media.

12. The filter cartridge of claim 8, wherein the one or more radial support regions comprise extruded continuous bands up to 1" in width.

13. A filter cartridge configured for filtering particles from a gas or liquid, comprising:
    a filter media comprising a plurality of pleats and arranged in a substantially cylindrical or conical structure about an axis; and
    one or more radial support regions in circumferential contact with an inner surface and an outer surface of the filter media, wherein spacing of the plurality of pleats is maintained at least in part by the one or more radial support regions, and wherein the one or more radial support regions comprise extruded thermoplastic polyester elastomeric (TPE) material.

14. The filter cartridge of claim 13, wherein the one or more radial support regions are configured to provide radial support and containment of the filter media.

15. The filter cartridge of claim 13, wherein the one or more radial support regions comprise one or more continuous bands in contact with at least a portion of the filter media.

16. The filter cartridge of claim 13, further comprising a metal mesh in contact with at least one of the inner surface or the outer surface of the filter media.

17. The filter cartridge of claim 13, wherein the one or more radial support regions comprise extruded continuous bands up to 1" in width.

18. The filter cartridge of claim 13, further comprising at least one end cap with at least a portion of the filter media secured to the end cap.

* * * * *